United States Patent [19]

Nagai

[11] Patent Number: 5,995,373
[45] Date of Patent: *Nov. 30, 1999

[54] ELECTRONIC APPARATUS HAVING A HINGE STRUCTURE

[75] Inventor: Michio Nagai, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/578,935

[22] Filed: Dec. 27, 1995

[30] Foreign Application Priority Data

Dec. 30, 1994 [JP] Japan ................................. 6-340431

[51] Int. Cl.$^6$ ............................. H05K 5/00; H01R 39/00
[52] U.S. Cl. ...................... 361/755; 361/679; 361/727; 361/736; 361/803; 439/31; 439/165; 379/434; 16/223
[58] Field of Search ................................... 361/724–728, 361/736, 740, 741, 747, 748, 752, 753, 756, 759, 784, 796–803, 816, 818, 825, 829, 679; 312/223.1; 174/35 R, 51; 379/433, 428, 434, 438; 455/90, 300; 403/331; 307/89–91; 16/223; 439/65–67, 341, 165, 31

[56] References Cited

U.S. PATENT DOCUMENTS

| | | |
|---|---|---|
| 5,001,659 | 3/1991 | Watabe . |
| 5,141,446 | 8/1992 | Ozouf et al. . |
| 5,237,488 | 8/1993 | Moser et al. ............................ 361/681 |
| 5,253,142 | 10/1993 | Weng ...................................... 361/680 |
| 5,278,725 | 1/1994 | Konno et al. ........................... 361/680 |
| 5,328,379 | 7/1994 | Kobayashi . |
| 5,355,279 | 10/1994 | Lee et al. ................................ 361/681 |
| 5,390,075 | 2/1995 | English et al. ......................... 361/683 |
| 5,547,144 | 8/1996 | Sakamoto et al. . |

FOREIGN PATENT DOCUMENTS

| | | |
|---|---|---|
| 92308869 | 9/1992 | European Pat. Off. . |
| 9524904 | 12/1995 | United Kingdom . |

OTHER PUBLICATIONS

IBM Technical Disclosure Bulletin; vol. 37, No. 11, Nov. 1994; Flexible Interface Cable for Portaable PC.

*Primary Examiner*—Donald Sparks
*Assistant Examiner*—Jayprakash N. Gandhi
*Attorney, Agent, or Firm*—Whitham, Curtis & Whitham

[57] ABSTRACT

In an electronic apparatus having a first and a second casing part, when the casing parts are rotated relative to each other about a hinge structure, a first and a second sleeve constituting a connector are also rotated relative to each other. A flexible conductive member is received in the sleeves so as to set up electrical connection between circuit portions built in the casing parts. The connector is removable from the circuit portions of the casing parts. In the event of assembly, the electrical connection is set up only if the connector is connected to the circuit portions.

21 Claims, 8 Drawing Sheets

ELECTRONIC APPARATUS HAVING A HINGE STRUCTURE

BACKGROUND OF THE INVENTION

The present invention relates to an electronic apparatus having a plurality of casing parts and, more particularly, to a hinge structure for connecting the casing parts mechanically and electrically to each other.

Today, with the advance of miniaturization of electronic circuits, various kinds of electronic apparatuses including desktop calculators and portable radio apparatuses are available in sizes small enough to be put even in the pockets of clothings. However, the miniaturization reduces areas to be allocated to keys, display and so forth and thereby obstructs maneuverability. In order to solve this problem, the apparatus may be provided with a foldable configuration including a hinge structure, as proposed in various forms in the past. Specifically, the apparatus may be constituted by a plurality of casing parts hinged such that they can be unfolded to a size great enough to facilitate the manipulation.

The prerequisite with the above foldable apparatus is that the hinge sets up electrical connection between the plurality of casing parts. To meet this requirement, some hinge structures capable of electrically connecting the housing parts have been proposed. For example, to electrically connect circuit portions disposed in two casing parts, use may be made of a flexible printed circuit board wrapped around a pin included in a hinge portion, or a signal line, as taught in Japanese Patent Laid-Open Publication No. 62-91867 by way of example. However, this kind of hinge structure, particularly one using a flexible printed circuit board, needs complicated assembling work and expertness and has only a limited assembling efficiency.

In light of the above, two casing parts may be directly connected by connectors. For example, Japanese Patent Laid-Open Publication No. 5-197447 discloses a connector structure applied to a laptop personal computer. The laptop personal computer is made up of a body and a flat panel type display unit. The body and display unit are each provided with the respective connector. The connectors are removably coupled to each other so as to directly connect the body and display unit mechanically and electrically. However, because this kind of structure is not intended to implement a hinge structure, it is difficult to use the structure as a hinge structure for rotatably connecting the body and display unit. Although such a connector structure may be so configured as to rotatably connect the body and display unit, it must support them mechanically. This brings about another problem in the mechanical strength aspect.

Hence, a flexible printed circuit board is essential with the hinge structure of the kind mechanically and electrically connecting the body and display unit. Therefore, the assembly involves a great number of steps and consumes time.

SUMMARY OF THE INVENTION

It is therefore an object of the present invention to provide an improved hinge structure capable of setting up electrical connection while guaranteeing mechanical strength, and reducing the number of assembling steps.

It is another object of the present invention to provide an electronic apparatus having the above improved hinge structure.

An electronic apparatus of the present invention has a first and a second casing part each accommodating the respective circuit portion therein. A hinge structure connects the first and second casing part such that they are rotatable relative to each other, and electrically connects the circuit portions. The hinge structure has a connector removably connected to the circuit portions.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 7:
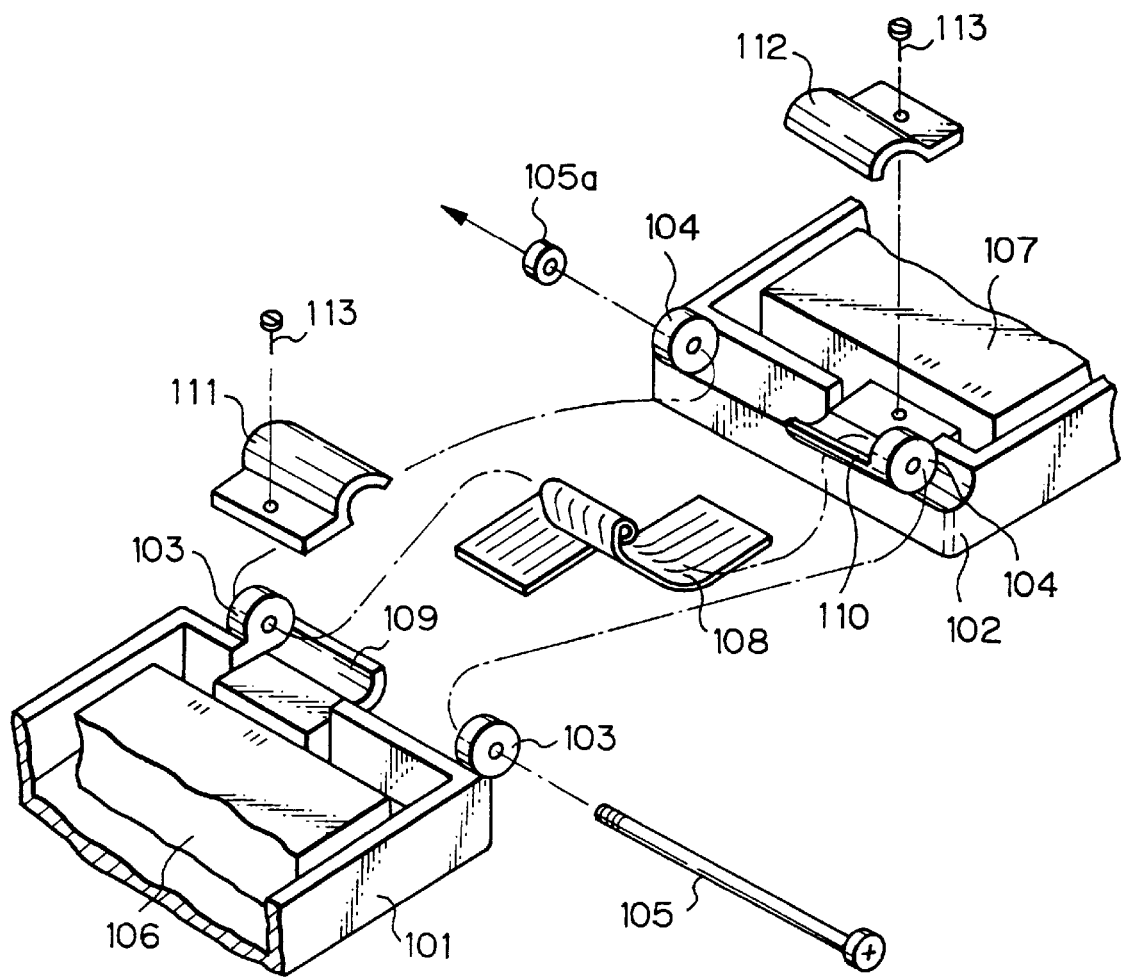
FIG. 7 is an exploded perspective view of a conventional hinge structure applied to an electronic apparatus.

To better understand the present invention, a brief reference will be made to a conventional hinge structure for rotatably and electrically connecting two casing parts, shown in FIG. 7. As shown, two casing parts 101 and 102 have two bearings 103 and two bearings 104, respectively. A threaded pin 105 is passed through the aligned holes of the bearings 103 and 104. A nut 105a is held in threaded engagement with the pin 105 in order to prevent it from slipping out of the bearings 103 and 104. Circuit portions 106 and 107 are mounted on the casing parts 101 and 102, respectively. A flexible printing circuit board 108 has its intermediate portion wrapped around the pin 105 by one turn, and has its opposite ends soldered or otherwise connected to the circuit portions 106 and 107. Receiving portions 109 and 110 having a semicircular cross-section protrude from the casing parts 101 and 102, respectively. The receiving portions 109 and 110 and covers 111 and 112 cover the circuit board 108, thereby protecting it from damage. The covers 111 and 112 are respectively affixed to the casing parts 101 and 102 by screws 113, adhesive, or similar affixing means.

The problem with the above hinge structure is that the assembling work is complicated and needs expertness, as discussed earlier. In addition, the assembling efficiency is extremely low. Specifically, it is necessary to pass the pin 105 through one of the bearings 103 and 104, wrap the flexible circuit board 108 around the pin 105, solder or otherwise connect opposite ends of the circuit board 108 to the circuit portions 106 and 107, pass the pin 105 through the other bearing 103 or 104 while maintaining the connection of the circuit board 108 to the circuit portions 106 and 107, and then fitting the nut 105a on the pin 105. Further, it is necessary to affix the covers 111 and 112 to the casing parts 101 and 102 by screws or adhesive.

Figure 8:
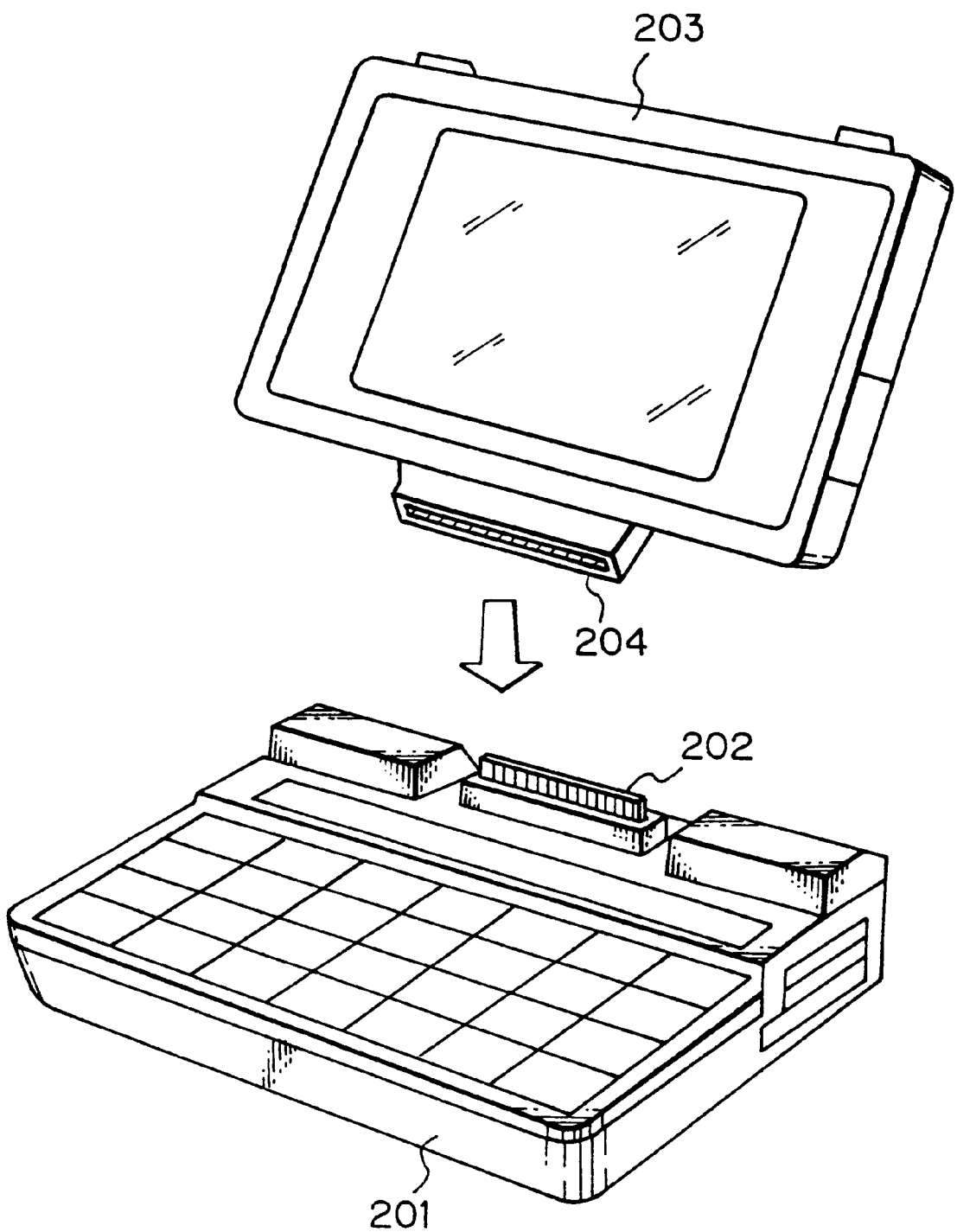
FIG. 8 is a perspective view of a conventional connector structure applied to a personal computer.

FIG. 8 shows a conventional connector structure capable of obviating the above complicated assembly and disclosed in previously mentioned Japanese Patent Laid-Open Publication No. 5-197447. As shown, a laptop personal computer is made up of a body 201 and a flat panel type display unit 203. The body 201 and display unit 203 are provided with connectors 202 and 204, respectively. The connectors 202 and 204 are removably coupled to each other so as to directly connect the body 201 and display unit 203 mechanically and electrically. However, because this kind of structure is not intended to implement a hinge structure, it is difficult to use the structure as a hinge structure for rotatably connecting the body 201 and display unit 203. Although such a connector structure may be so configured as to rotatably connect the body 201 and display unit 203, it must support them mechanically. This brings about another problem in the mechanical strength aspect.

Figure 1:
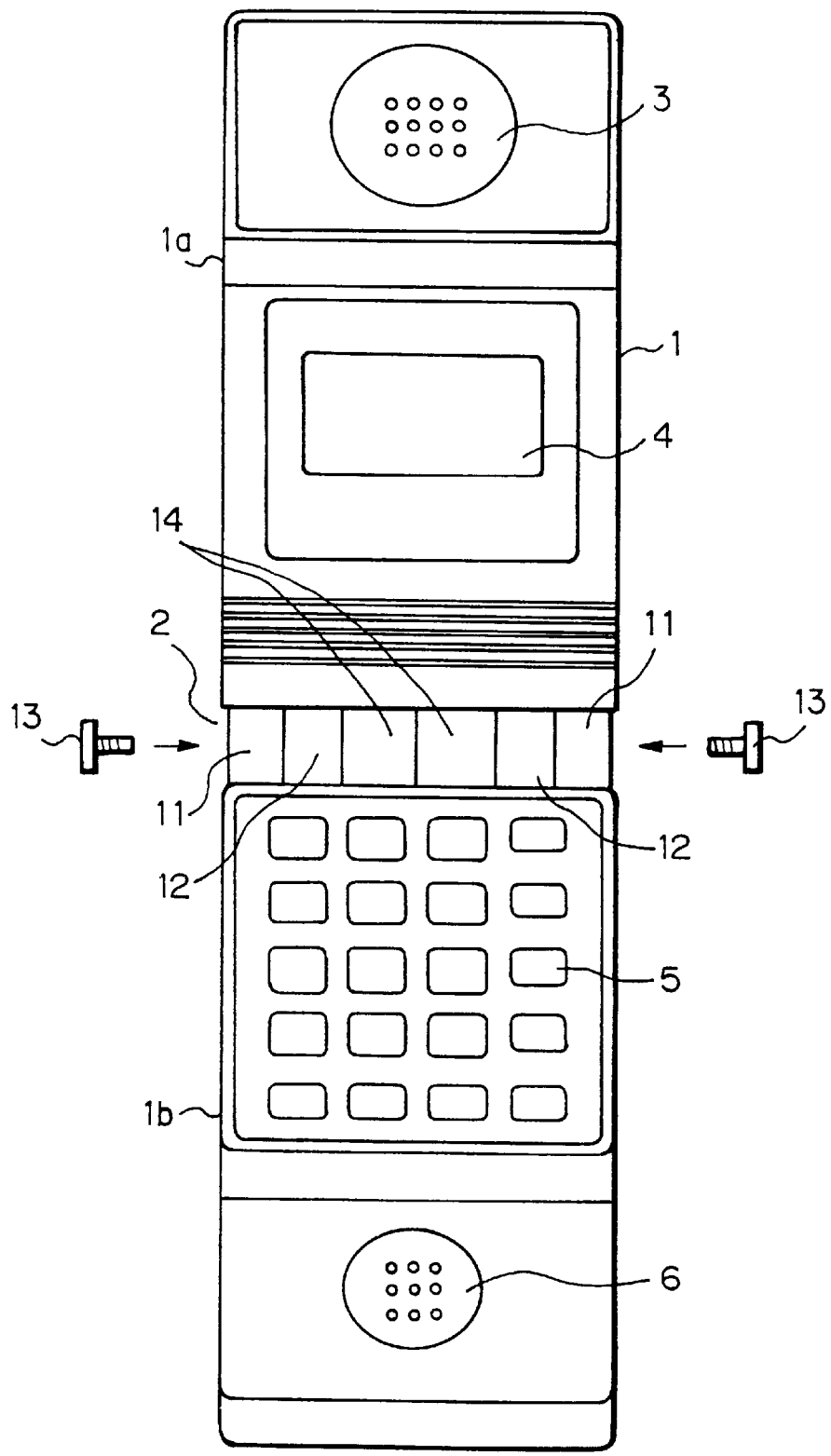
FIG. 1 is a front view of a portable telephone to which a hinge structure embodying the present invention is applied.
Figure 2:
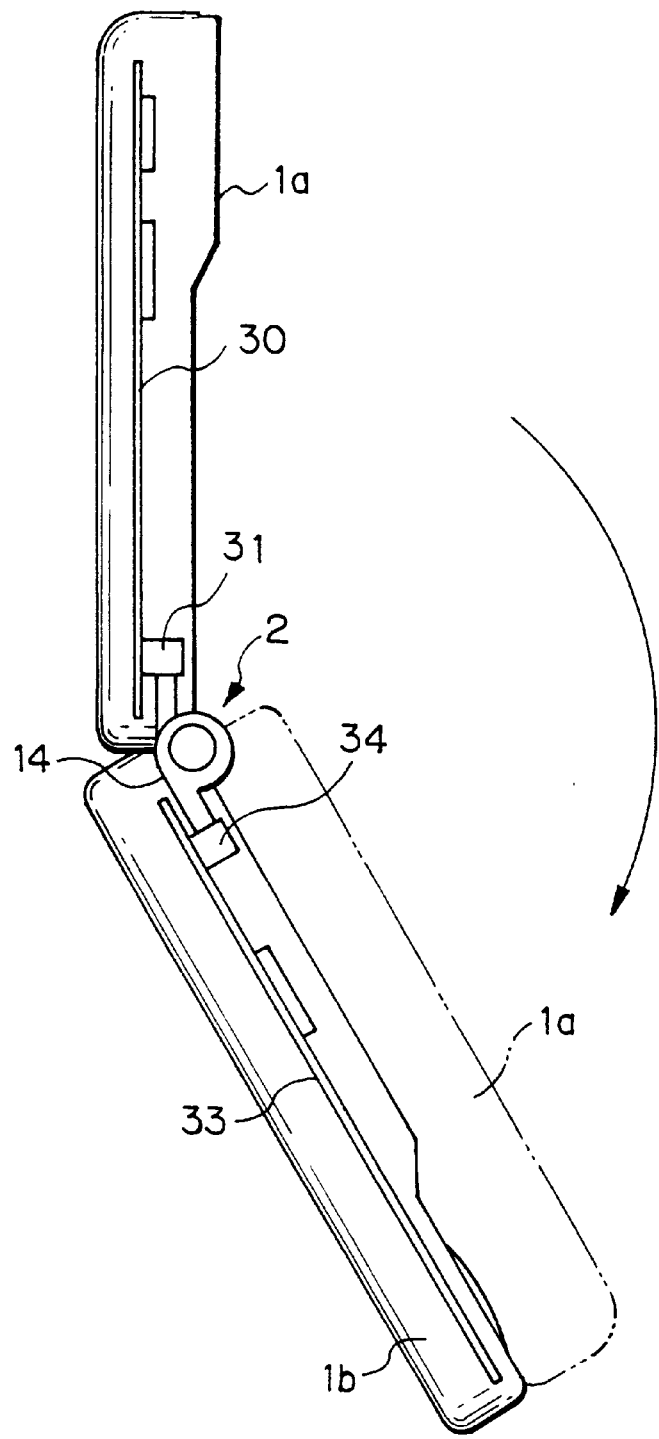
FIG. 2 is a side elevation, as viewed from the left, showing the internal arrangement of the embodiment.

Referring to FIGS. 1 and 2, a hinge structure embodying the present invention is shown and applied to a foldable portable telephone by way of example. As shown, the telephone has an upper casing part 1a and a lower casing part 1b. The upper casing part 1a is rotatably connected to the top of the lower casing part 1b by a hinge portion 2. A receiver 3 and a display 4 are arranged on the front of the casing part 1a while various keys 5 and a transmitter 6 are arranged on the casing part 1b. When the telephone is used, the casing parts 1a and 1b are unfolded or opened about the hinge portion 2 to a position indicated by a solid line in FIG. 2. When the telephone is not used, the casing parts 1a and 1b are folded to a position indicated by a phantom line in FIG. 2.

Figure 3:
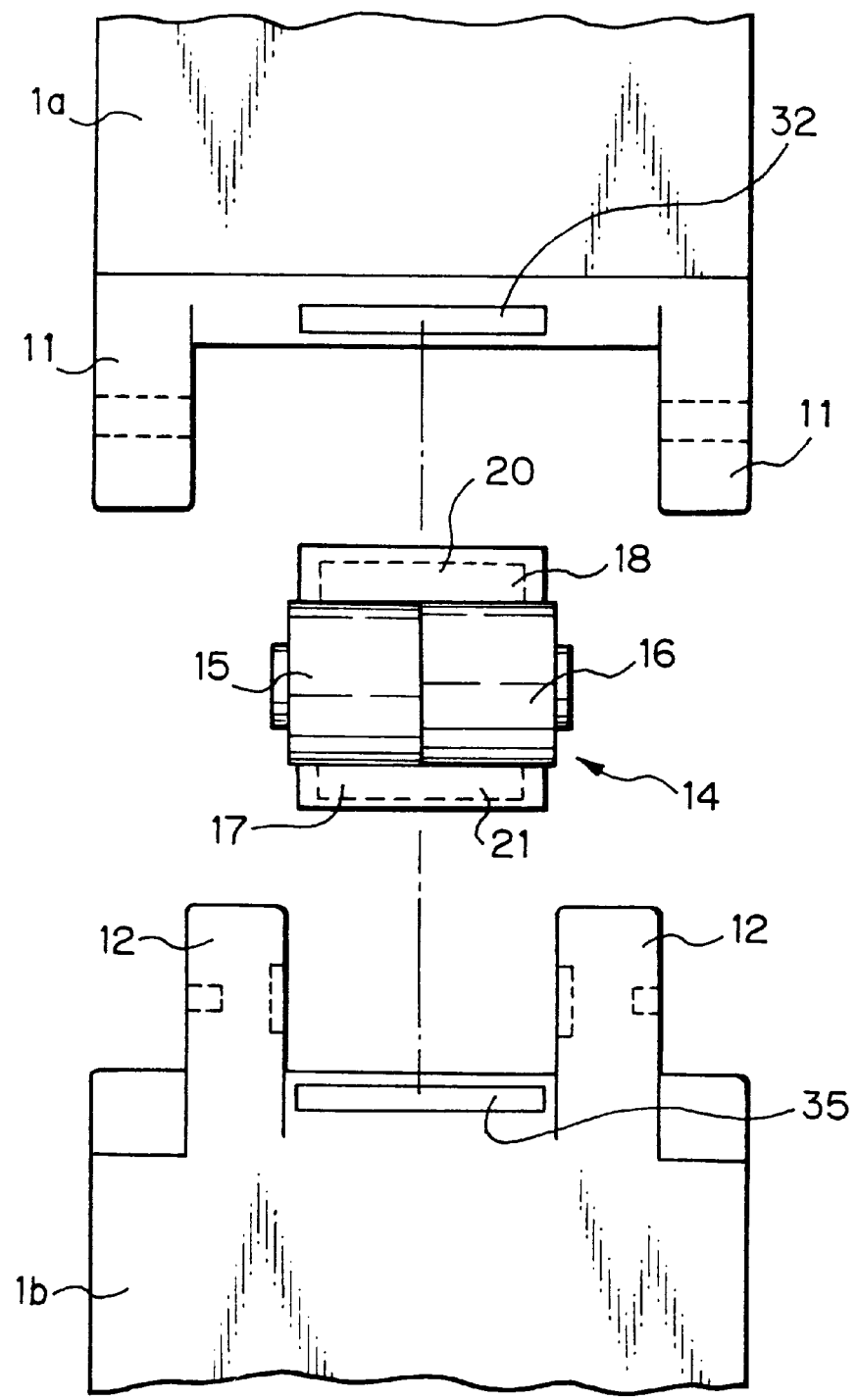
FIG. 3 is a fragmentary exploded front view of the embodiment.
Figure 4:
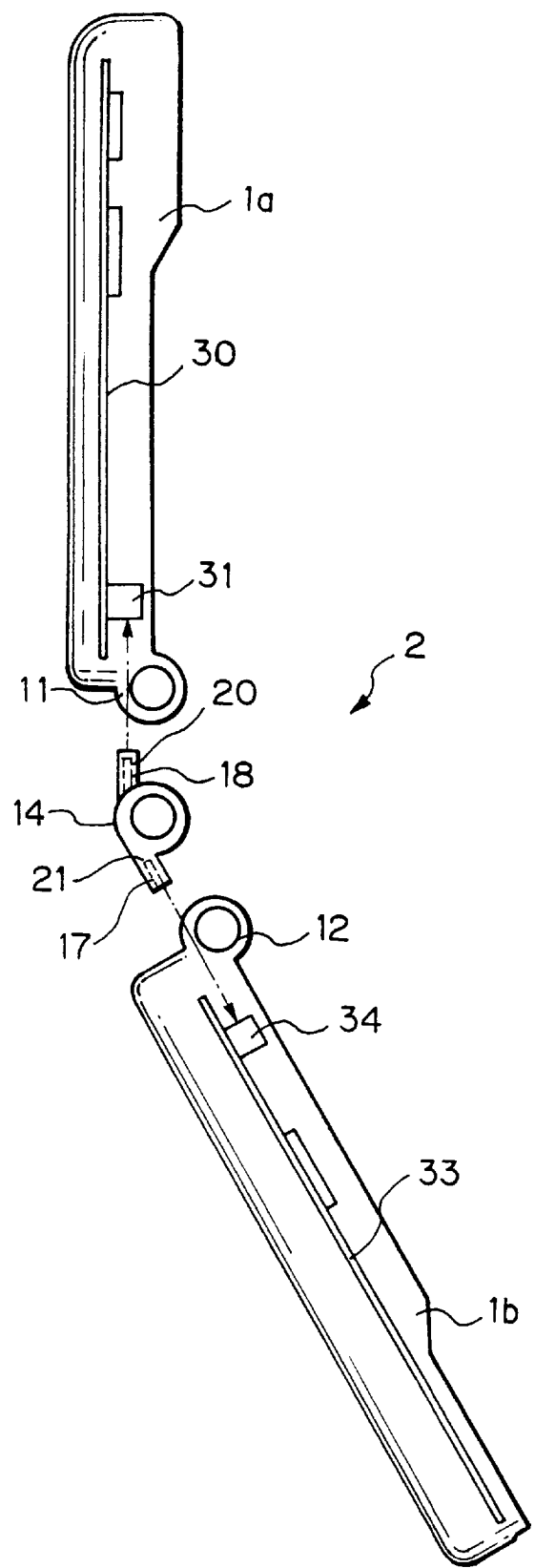
FIG. 4 is a side elevation, as viewed from the left, showing the embodiment in an exploded condition.

The casing parts 1a and 1b and hinge portion 2 are shown in a separated condition in FIGS. 3 and 4. As shown, a pair of upper bearings 11 protrude from opposite sides of the casing part 1a. Likewise, a pair of lower bearings 12 protrude from opposite sides of the other casing part 1b. The lower bearings 12 are positioned inboard of of the upper bearings 1. A shown in FIG. 11, screws 13 are respectively passed through the bearings 11 protruding from the casing part 1a, and then threaded into the bearings 12 inboard of the bearings 11. As a result, the casing parts 1a and 1b are hinged, e.g., rotatably connected to each other by the screws 13.

Figure 5:
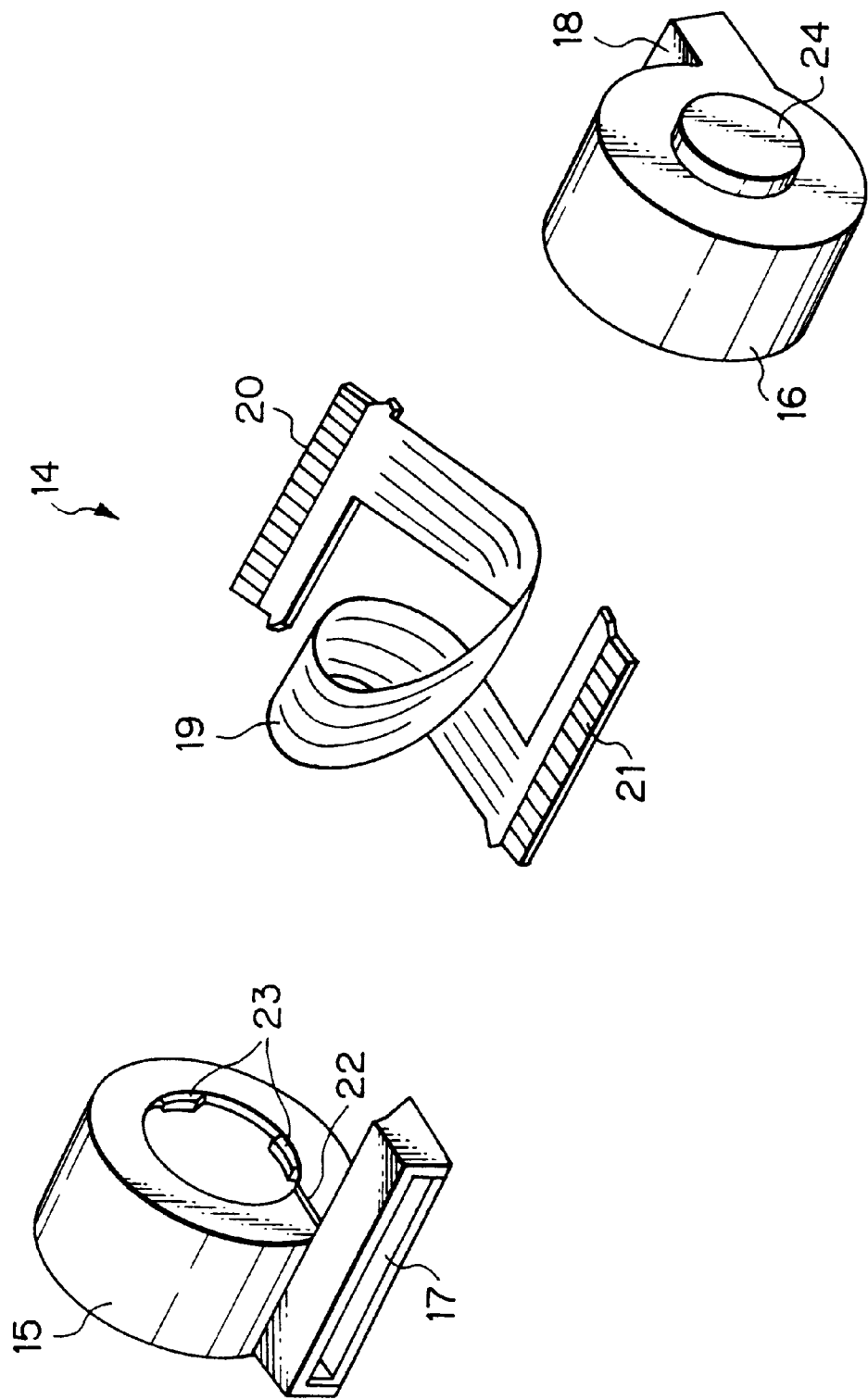
FIG. 5 is an exploded perspective view of a hinge connector included in the embodiment.

A hinge connector 14 is supported by the casing part 1b between the pair of bearings 12. As shown in an exploded view in FIG. 5, the hinge connector 14 is made up of a pair of sleeves 15 and 16 which are separate in the axial direction of the connector 14. Trough-like coupling portions 17 and 18 respectively protrude from the sleeves 15 and 16 substantially in the radial direction and extend in the axial direction of the connector 14. The coupling portions 17 and 18 are adaptive to, e.g., PCMCIA slots. A flexible printed circuit board 19 has its intermediate portion bent and received in the sleeves 15 and 16. Opposite ends of the circuit board 19 are implemented as PCMCIA connectors 20 and 21 and respectively received in and affixed to the coupling portions 17 and 18. The sleeves 15 and 16 are each formed with a slit 22 (only the slit 22 of the sleeve 15 is visible) for inserting the circuit board 19, locking pieces 23 (only the pieces 23 of the sleeve 15 are visible) for locking the sleeves 15 and 16 to each other in the axial direction while allowing them to freely move about the axis of the connector 14, and a stub 24 (only the stub 24 of the sleeve 16 is visible) for journalling the sleeves 15 and 16 to the bearings 12.

As shown in FIG. 4, a circuit board 30 is disposed in the casing part 1a while a connector 31 is mounted on the board 30 in the vicinity of the hinge portion 2. A slit 32 (see FIG. 3) is formed in the casing part 1a between the bearings 11, so that the connector 31 is accessible via the slit 32.

Likewise, a circuit board 33 is disposed in the casing part 1b while a connector 34 is mounted on the board 33 in the vicinity of the hinge portion 2. A slit 35 is formed in the casing part 1b between the bearings 12, so that the connector 34 is accessible via the slit 35.

The above hinge structure is assembled by the following procedure. First, the sleeves 15 and 16 of the hinge connector 14 are put together in a coaxial condition. Then, the connector 14 is positioned between the bearings 12 and journalled thereto at its stubs 24. The coupling portion 17 is inserted into the casing part 1b via the slit 35 so as to connect one connector 21 of the flexible circuit board 19 to the connector 34. As a result, the circuit board 19 is electrically connected to the circuit board 33 disposed in the casing part 1b.

Subsequently, the bearings 11 of the casing part 1a are positioned at both sides of the bearings 12. Then, the bearings 11 and 12, i.e., casing parts 1a and 1b are connected together by the screws 13, as stated earlier. At this instant, the other coupling portion 18 of the hinge connector 14 is inserted into the slit 32 of the casing part 1a so as to connect the other connector 20 of the flexible printed circuit board 19 to the connector 31. This electrically connects the circuit board 19 to the circuit board 30 disposed in the casing part 1a. Consequently, the circuit boards 30 and 33 are electrically connected to each other by the hinge connector 14.

In practice, when the casing parts 1a and 1b are folded or unfolded about the hinge portion 2, the sleeves 16 and 15 whose coupling portions 18 and 17 are received in the housing parts 1a and 1b are rotated relative to each other. Although this relative rotation exerts a force on the flexible printed circuit board 19, the board 19 can follow the relative rotation because its intermediate portion is turned and has a sufficient dimensional margin.

As stated above, the hinge structure connecting the casing parts 1a and 1b is implemented by the bearings 11 and 12 formed integrally with the parts 1a and 1b, respectively, and the screws 13 connected the bearings 11 and 12. This kind of structure has great mechanical strength. As to the electrical connection of the casing parts 1a and 1b, the coupling portions 18 and 17 of the hinge connector 14 are respectively received in the slits 32 and 35 of the casing parts 1a and 1b, so that the connectors 20 and 21 of the flexible circuit board 19 are connected to the connectors 31 and 34, respectively. This eliminates the need for soldering or similar affixing means and thereby reduces the number of assembling steps, i.e., simplifies the assembly.

Figure 6:
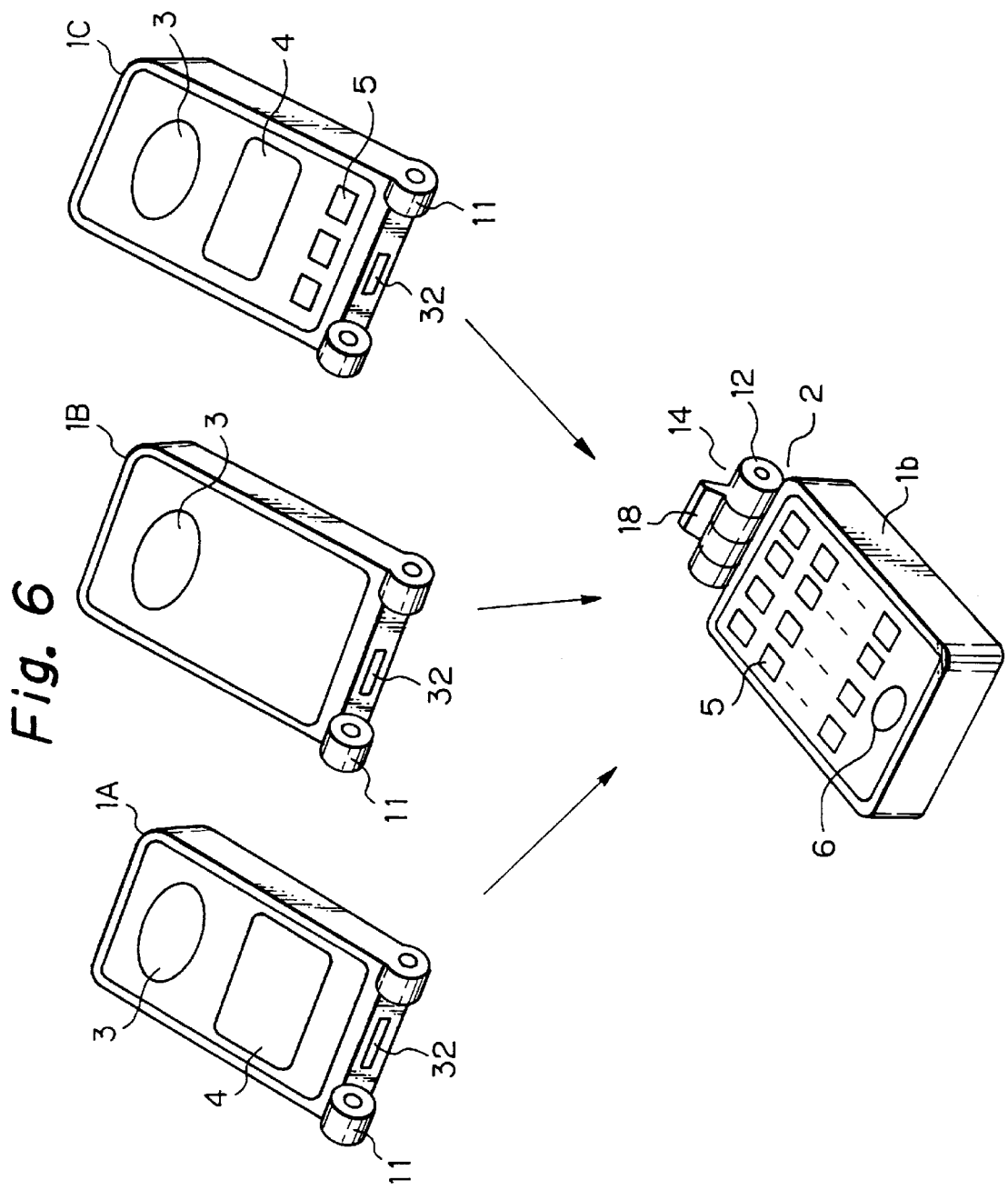
FIG. 6 is a view showing that an upper casing part included in the embodiment is replaceable.

If the connectors 31 and 34 built in the casing parts 1a and 1b are standardized, then the casing part 1a can be easily replaced with another casing part identical in contour and hinge portion, but different in function. Specifically, FIG. 6 shows an upper casing 1A having the display 4 and speaker 3, an upper casing 1B having only the speaker 3, and an upper casing IC having the display 4, speaker 3, and keys 5. In this manner, the portable telephone can be provided with desired one of a broad range of configurations.

While the illustrative embodiment is applied to a portable telephone foldable in two, the present invention is practicable with any kind of electronic apparatus so long as the apparatus is foldable in two, three or more. Also, the present invention is applicable not only to a portable radio apparatus but also to a laptop personal computer or word processor or similar electronic apparatus having a hinge structure.

In summary, in accordance with the present invention, an electronic apparatus has a first and a second casing part connected together by a hinge structure, and a connector removably connected to circuit portions disposed in the two casing parts. The connector is implemented as a hinge structure rotatable in unison with the relative rotation of the casing parts. When the casing parts are rotated relative to each other about the hinge structure, two sleeves constituting the connector are also rotated relative to each other. A flexible conductive member is disposed in the sleeves so as to electrically connect the circuit portions of the casing parts. Hence, the hinge structure guarantees the mechanical strength of the casing parts. At the same time, because the connector is removable from the circuit portions of the casing parts, the casing parts can be mechanically and electrically connected together only if the connector is connected to the casing parts. This simplifies the assembly to a significant degree.

Various modifications will become possible for those skilled in the art after receiving the teachings of the present disclosure without departing from the scope thereof.

What is claimed is:

1. An electronic apparatus comprising:
   a first casing part and a second casing part each accommodating a respective circuit portion therein;
   a hinge structure which mechanically connects said first casing part and said second casing part such that the casing parts are rotatable relative to each other; and
   a connector which electrically connects said circuit portions, said connector contained within a housing having a first end which extends into and insertably engages said first casing part and a second end which extends into and insertably engages said second casing part.

2. An electronic apparatus as claimed in claim 1, wherein the housing of said connector comprises a first sleeve having the first end thereon and a second sleeve having the second end thereon, wherein said first sleeve and said second sleeve are rotatable relative to each other about an axis passing through said first sleeve and said second sleeve, and wherein a flexible conductive member which electrically connects said circuit portions to each other is received in said first sleeve and said second sleeve.

3. An apparatus as claimed in claim 2, wherein said first casing part and said second casing part comprise respective bearings connected together by screws, and wherein said first sleeve and said second sleeve are positioned coaxially with and between said bearings.

4. An apparatus as claimed in claim 2, wherein said flexible conductive member comprises a flexible printed circuit board removably connected to connectors provided in said first casing part and said second casing part, and wherein said first sleeve and said second sleeve comprise respective coupling portions for respectively receiving and supporting opposite ends of said flexible printed circuit board.

5. An apparatus as claimed in claim 2, wherein said first sleeve and said second sleeve rotate in reverse directions relative to one another.

6. An apparatus as claimed in claim 2, wherein a first end of said flexible conductive member resides in the first end of the housing and a second end of said flexible conductive member resides in the second end of the housing, and wherein the first end of said flexible conductive member matably contacts the circuit portion in said first casing part and the second end of said flexible conductive member matably contacts the circuit portion in said second casing part.

7. An apparatus as claimed in claim 6, wherein the first end and the second end of the flexible conductive member matably contact respective circuit portions in said first casing part and said second casing part in a manner which conforms with a PCMCIA standard.

8. An apparatus as claimed in claim 2, wherein said flexible conductive member is a flat cable.

9. An electronic apparatus as recited in claim 1, wherein said hinge structure further includes:
   a first set of bearings on said first casing part;
   a second set of bearings on said second casing part;
   at least one coupling member which couples said first set of bearings to respective ones of said second set of bearings,
   wherein said first set of bearings, said second set of bearings, and said coupling member mechanically connect said first casing part to said second casing part, so that said connector bears substantially none of mechanical forces exerted on said hinge structure by said first casing part and said second casing part.

10. An apparatus as claimed in claim 9, wherein the housing of said connector includes two stubs respectively disposed on opposing sides of the housing, said connector being mounted between at least said one of said first set of bearings and said second set of bearings by inserting said stubs into complementary recesses in one of said first set of bearings and said second set of bearings.

11. An apparatus as claimed in claim 10, wherein the housing of said connector is removable from said at least one of said first set of bearings and said second set of bearings when said hinge structure releases said first casing part from said second casing part.

12. An electronic apparatus as recited in claim 1, wherein said connector includes a flexible conductive member for carrying signals between the circuit portions.

13. An electronic apparatus as recited in claim 12, wherein said flexible conductive member is disposed within said hinge structure in a coiled configuration.

14. An electronic apparatus as recited in claim 13, wherein said connector further includes:
   a first sleeve rotatably coupled to a second sleeve, with respective portions of said flexible conductive member being disposed within said first sleeve and said second sleeve.

15. An electronic apparatus as recited in claim 14, wherein said flexible conductive member flexes within at least one of said first sleeve and said second sleeve to relieve stresses exerted on said flexible conductive member as a result of said first sleeve rotating relative to said second sleeve.

16. An electronic apparatus as recited in claim 14, wherein said first sleeve and second sleeve form a modular unit.

17. An electronic apparatus as claimed in claim 1, wherein at least one of the first end and the second end of the housing is adapted for coupling to a third casing part which performs at least one function different from said first casing part and said second casing part.

18. An electronic apparatus as recited in claim 1, wherein said electronic apparatus is one of the group consisting of a telephone and a portable computer.

19. An electronic apparatus comprising:
   a first casing part and a second casing part each accommodating a respective circuit portion therein;
   a hinge structure connecting said first casing part and said second casing part such that the casing parts are rotatable relative to each other, and electrically connecting the circuit portions;

said hinge structure comprising a connector removably connected to said circuit portions, and wherein said connector comprises a first sleeve connected to said circuit portion of one of said first casing part and said second casing part, and a second sleeve connected to said circuit portion of the other of said first casing part and said second casing part, wherein said first sleeve and said second sleeve are rotatable relative to each other about an axis of said hinge structure, and wherein a flexible conductive member for electrically connecting said circuit portions to each other is receive in said first sleeve and said second sleeve.

20. An apparatus as claimed in claim 19, wherein said first casing part and said second casing part comprising respective bearings connected together by screws, and wherein said first sleeve and said second sleeve are positioned coaxially with and between said bearings.

21. An apparatus as claimed in claim 20, wherein said flexible conductive member comprises a flexible printed circuit board removably connected to connectors provided in said first casing part and said second casing part, and wherein said first sleeve and said second sleeve comprising respective coupling portions for respectively receiving and supporting opposite ends of said flexible printed circuit board.

\* \* \* \* \*